United States Patent
Fenchel et al.

(10) Patent No.: US 8,064,674 B2
(45) Date of Patent: Nov. 22, 2011

(54) ROBUST CLASSIFICATION OF FAT AND WATER IMAGES FROM 1-POINT-DIXON RECONSTRUCTIONS

(75) Inventors: Matthias Fenchel, Erlangen (DE); Christophe Chefd'hotel, Jersey City, NJ (US)

(73) Assignee: Siemens Aktiengesellschaft, München ( * ) Notice: Subject to any disclaimer, the term of this patent is extended or adjusted under 35 U.S.C. 154(b) by 410 days.

(21) Appl. No.: 12/467,614

(22) Filed: May 18, 2009

(65) Prior Publication Data

US 2010/0111390 A1  May 6, 2010

Related U.S. Application Data

(60) Provisional application No. 61/110,615, filed on Nov. 3, 2008.

(51) Int. Cl.
*G06K 9/62* (2006.01)
*G06T 7/00* (2006.01)
*G06N 5/02* (2006.01)

(52) U.S. Cl. .......... 382/131; 382/228; 600/410

(58) Field of Classification Search .......... 382/128–134, 382/154; 600/407–410
See application file for complete search history.

(56) References Cited

U.S. PATENT DOCUMENTS

| | | | |
|---|---|---|---|
| 6,245,027 B1 * | 6/2001 | Alperin | 600/561 |
| 6,466,014 B1 * | 10/2002 | Ma | 324/307 |
| 6,624,632 B2 | 9/2003 | Iriguchi | |
| 7,292,039 B1 | 11/2007 | Laub | |
| 7,720,267 B2 * | 5/2010 | Fuchs et al. | 382/128 |
| 2008/0077003 A1 * | 3/2008 | Barth et al. | 600/407 |
| 2008/0139920 A1 * | 6/2008 | Biglieri et al. | 600/410 |
| 2009/0306496 A1 * | 12/2009 | Koo et al. | 600/417 |

OTHER PUBLICATIONS

Dixon W. T. Simple proton spectroscopic imaging. Radiology 1984; 153:189-194.
Glover GH, Schneider E. Three-point Dixon technique for true water/fat decomposition with B0 inhomogeneity correction. Magn Reson Med 1991;18:371-383.
Ma J. Breath-hold water and fat imaging using a dual-echo two-point Dixon technique with an efficient and robust phase-correction algorithm. Magn Reson Med 2004;52: 415-419.
Coombs BD, Szumowiski J, Coshow W. Two-point Dixon technique for water-fat signal decomposition with B0 inhomogeneity correction. Magn Reson Med 1997; 38: 884-889.

* cited by examiner

*Primary Examiner* — Hoa Pham
(74) *Attorney, Agent, or Firm* — Donald B. Paschburg

(57) ABSTRACT

Dixon methods in magnetic resonance imaging generate MRI images that may contain at least two tissue components such as fat and water. Dixon methods generate images containing both tissue components and predominantly one tissue component. A first segmentation of a first tissue component is generated in a T1 weighted image. The segmentation is correlated with at least a first and a second Dixon image. The image with the highest correlation is assigned the first tissue component.

20 Claims, 8 Drawing Sheets

Dixon Fat Segmentation

Dixon Water Segmentation

ROBUST CLASSIFICATION OF FAT AND WATER IMAGES FROM 1-POINT-DIXON RECONSTRUCTIONS

CROSS-REFERENCE TO RELATED APPLICATIONS

This application claims the benefit of U.S. Provisional Application No. 61/110,615, filed Nov. 3, 2008, which is incorporated herein by reference.

BACKGROUND OF THE INVENTION

The present invention relates to methods and apparatus for image classification. In particular, it relates to segmentation and classification of medical MRI images based on fat and/or water content.

MRI systems are known. FIG. 1 shows a diagram of a magnetic resonance imaging (MRI) system 100 enabled to perform the methods that are an aspect of the present invention. The MRI system 100 includes a magnet system 112, a control system 120, a gradient coil driver 130, and an RF coil driver 128. The magnet system 112 includes a magnet 114, a gradient coil 116, and an RF coil 118. The control system 120 includes a sequence control unit 122, a data acquisition unit 126, and a controller 124 that controls the operations of the sequence control unit 22 and the data acquisition unit 126. Control system 120 may be implemented via any type of processing device(s), such as on a single computing device or as multiple computing devices networked together (e.g., over a LAN). The control system 120 may provide output signals to at least one display device 140, which may be a computer screen to display an image that is generated in accordance with one or more aspects of the present invention. A display device may also be an apparatus that generates a film containing an image. The control system 120 may also have an input device 141, which may provide control commands to the controller. A control device may be a keyboard, it may also be a mouse or a track-ball or any other device that can provide commands to the controller. The system may also have a plurality of input devices.

The magnet 114 includes resistance or superconducting coils (not shown) that generate a steady, uniform magnetic field. The uniform magnetic field is generated in a scanning space or region in which the subject to be examined is disposed. For example, if the subject is a person or patient to be examined, the person or portion of the person to be examined is disposed in the scanning region.

The gradient coil 116 generates magnetic field gradients that are used to cause the strength of the static magnetic field produced by the magnet 114 to undergo gradients in the x, y, and z directions or combinations thereof. The gradient coil driver 130 is in communication with the gradient coil 116 and applies a driving signal to the gradient coil 116 for the purpose of generating magnetic field gradients.

The RF coil driver 128 is in communication with the RF coil 118 and transmits a driving signal to the RF coil 118. In response to receiving the driving signal, the RF coil 118 produces RF excitation signals (referred to as "RF pulses"), which are used for generating species (e.g., exciting nuclei) in the region of interest (e.g., an organ) of the subject being imaged within the space of the static magnetic field. The species generate a resonance signal that is detected by the RF coil 118. In some embodiments, a separate coil is used to detect the resonance signal. The data acquisition unit 126, which is in communication with the RF coil 118, acquires the resonance signal (sometimes referred to as an "echo") from the RF coil 118. The resonance signal is defined in a two-dimensional frequency domain or Fourier space, referred to as "k-space". The data acquisition unit 126 samples and digitizes the resonance signal and provides the resulting signal to the controller 124 as digital data for storage and/or further processing.

The controller 124 processes the digital data to obtain an image of the region of interest. The controller 124 may apply a variety of known image processing techniques to construct the image, which may be viewed on a display 140 coupled to the controller 124. The display may be provided, for example, as a monitor or a terminal, such as a CRT or flat panel display. It may also be a device that creates an image on film.

The sequence control unit 122 is connected to each of the gradient coil driver 130, the RF coil driver 128, and the controller 124. The controller 124 has a memory that stores programs having instructions that cause the sequence control unit 116 to direct the delivery of RF pulses and gradient fields from the RF coil 118 and the gradient coil 116 to the region of interest. In response to receiving control signals provided from the sequence control unit 122, the gradient coil driver 130 provides a driving signal to the gradient coil 116, and the RF coil driver 128 provides a driving signal to the RF coil 118. These and other details on an MRI scanner may be found in U.S. Pat. No. 7,292,039 to Laub et al. issued on Nov. 6, 2007 which is incorporated herein by reference.

It is to be understood that the actual implementation of components of an MRI system may be realized in different embodiments, for instance as demonstrated in the different embodiments that are available in the Siemens MAGNETOM series of MRI systems and that the diagram as provided herein is not intended to be limiting to a single embodiment of an MRI system.

Dixon introduced a new image technique to create MRI images of water only and fat only in "Dixon W. T. Simple proton spectroscopic imaging. Radiology 1984; 153:189-194" which is incorporated herein by reference in its entirety.

The technique as disclosed by Dixon is based on periodic variations in the free induction decay signal (FID) in acquiring an image. By applying different echo times one can acquire a "sum of fat and water" image and a "difference of fat and water" image, from which one may determine a fat image and a water image. One may call the original Dixon method a two-point method. The reconstructed images in the two-point method may suffer from errors due to inhomogeneities in the intensity of the magnetic field. Glover et al. in "Glover G H, Schneider E. Three-point Dixon technique for true water/fat decomposition with B0 inhomogeneity correction. Magn Reson Med 1991; 18:371-383" addressed the issue by acquiring three images in what is known as the 3-point Dixon method, which is incorporated herein by reference in its entirety.

Single-point Dixon methods are also known, for instance as disclosed in "Jong Bum Son et al, Concepts in Magnetic Resonance Part B: Magnetic Resonance Engineering, Volume 33B Issue 3, Pages 152-162 Published Online: 10 Jul. 2008, Wiley Publications, Single-point Dixon water-fat imaging using 64-channel single-echo acquisition MRI." and "A single-point Dixon technique for fat-suppressed fast 3D gradient-echo imaging with a flexible echo time", Jingfei Ma. Journal of Magnetic Resonance Imaging, February 2008, which are both incorporated herein by reference in their entirety.

These Dixon methods are capable of computing pure fat and pure water images from MR raw data making use of the defined difference in precession times between bound water protons and bound fat protons.

The One-point Dixon method is thus one embodiment of an imaging method. The methods and systems of distinguishing and classifying images as a fat image or a predominantly fat image or as a water image, or a predominantly water image as one or more aspects of the present invention can be applied to different MRI acquisition techniques, such as 1-point, 2-point, 3-point and any multi-point Dixon techniques, as long as a combined fat/water image, and at least one of a separate fat image or a predominantly fat image and a separate water image or predominantly water image are generated.

Although the separation from image data into two different images of mainly separate but connected components x and y such as water and fat by the Dixon methods is known, it is not straightforward to conclude that x is fat and y is water. This is especially the case for automatic recognition of an image as a fat image or as a water image by a machine such as a processor. While it is possible for a human operator to conclude that an image is a fat image, based for instance on a knowledge of a context, it is difficult to make such a conclusion automatically by a machine or by an untrained operator. Common heuristics often fail.

The MR scanning process acquires complex data containing phase and magnitude information. Dixon methods are based on relative phase information based on the assumption of defined phase differences at defined echo times caused by the different precession times between protons bound to fat and protons bound to water. Due to its periodic nature and the superimposition of other effects, phase information is not absolute which makes it difficult to determine automatically by a machine that a generated MRI image is a fat image or a water image.

The Dixon methods are capable of separating components which are connected by neighboring voxels. If there is no connection, then one component might be classified correctly and the other incorrectly. One may, for instance, take an MRI image of a head of a person with his arms next to the head. Because the pixels or voxels in an arm are not connected with the ones of the head in an MRI image, one may correctly assign the labels fat and water in the head image, but incorrectly in the arm image.

Accordingly, novel and improved apparatus and methods are required to classify a Dixon method based image automatically in a robust way into its appropriate class.

SUMMARY OF THE INVENTION

In accordance with an aspect of the present invention methods and systems are provided for classifying tissue type from MRI image data of an object.

In accordance with a further aspect of the present invention a method is provided for classifying tissue type from MRI image data of an object is provided including at least a first type and a second type of tissue, by processing a first set of MRI image data representing substantially the first type of tissue, and a combined set of MRI image data representing at least the first and the second type of tissue, comprising using a processor to create a segmentation from the combined set of MRI image data and to determine a first correlation value between the segmentation and the first set of MRI image data.

In accordance with yet a further aspect of the present invention the method is provided, wherein a pixel in the segmentation has an intensity value above a threshold.

In accordance with yet a further aspect of the present invention the method further comprises determining a threshold correlation value, comparing the first correlation value with the threshold correlation value, and assigning a tissue type to the first set of MRI image data based on the comparison of the previous step.

In accordance with yet a further aspect of the present invention the method further comprises determining a second correlation value between the segmentation and a second set of MRI image data of the object representing substantially the second tissue.

In accordance with yet a further aspect of the present invention the method further comprises classifying the tissue type of the first set of MRI image data based on a relative value of the first correlation value compared to the second correlation value.

In accordance with yet a further aspect of the present invention the method is provided, wherein the first set of MRI image data is generated by applying a Dixon method.

In accordance with yet a further aspect of the present invention the method is provided, wherein the first type of tissue is a fat tissue.

In accordance with yet a further aspect of the present invention the method is provided, wherein the segmentation is a grey value based segmentation.

In accordance with yet a further aspect of the present invention the method is provided, wherein the segmentation is performed by using a method selected from the group consisting of an expectation maximization segmentation method and an Otsu threshold segmentation method.

In accordance with yet a further aspect of the present invention the method is provided, wherein a classification is applied to one or more additional objects related to the object.

In accordance with another aspect of the present invention a system is provided, for classifying tissue type from MRI image data of an object including at least a first type and a second type of tissue, by processing a first set of MRI image data representing substantially the first type of tissue, and a combined set of MRI image data representing at least the first and the second type of tissue, comprising a Magnetic Resonance Imaging machine that generates magnetic resonance image data, a processor for processing the magnetic resonance data in accordance with instructions for performing the steps of creating a segmentation from the combined set of MRI image data, and determining a first correlation value between the segmentation and the first set of MRI image data.

In accordance with yet another aspect of the present invention a system is provided, wherein a pixel in the segmentation has an intensity value above a threshold.

In accordance with yet another aspect of the present invention a system further comprises instructions for determining a threshold correlation value, comparing the first correlation value with the threshold correlation value, and assigning a tissue type to the first set of MRI image data based on the comparison of the previous step.

In accordance with yet another aspect of the present invention a system further comprises instructions for determining a second correlation value between the segmentation and a second set of MRI image data of the object representing substantially the second tissue.

In accordance with yet another aspect of the present invention a system further comprises instructions for classifying the tissue type of the first set of MRI image data based on a relative value of the first correlation value compared to the second correlation value.

In accordance with yet another aspect of the present invention a system is provided, wherein the first set of MRI image data is generated by applying a Dixon method.

In accordance with yet another aspect of the present invention a system is provided, wherein the first type of tissue is a fat tissue.

In accordance with yet another aspect of the present invention a system is provided, wherein the segmentation is a grey gray value based segmentation. In accordance with yet another aspect of the present invention the system is provided, wherein the segmentation is performed by using a method selected from the group consisting of an expectation maximization segmentation method and an Otsu threshold segmentation method.

In accordance with yet another aspect of the present invention a system is provided, wherein a classification is applied to one or more additional objects related to the object.

DESCRIPTION OF A PREFERRED EMBODIMENT

Figure 1:
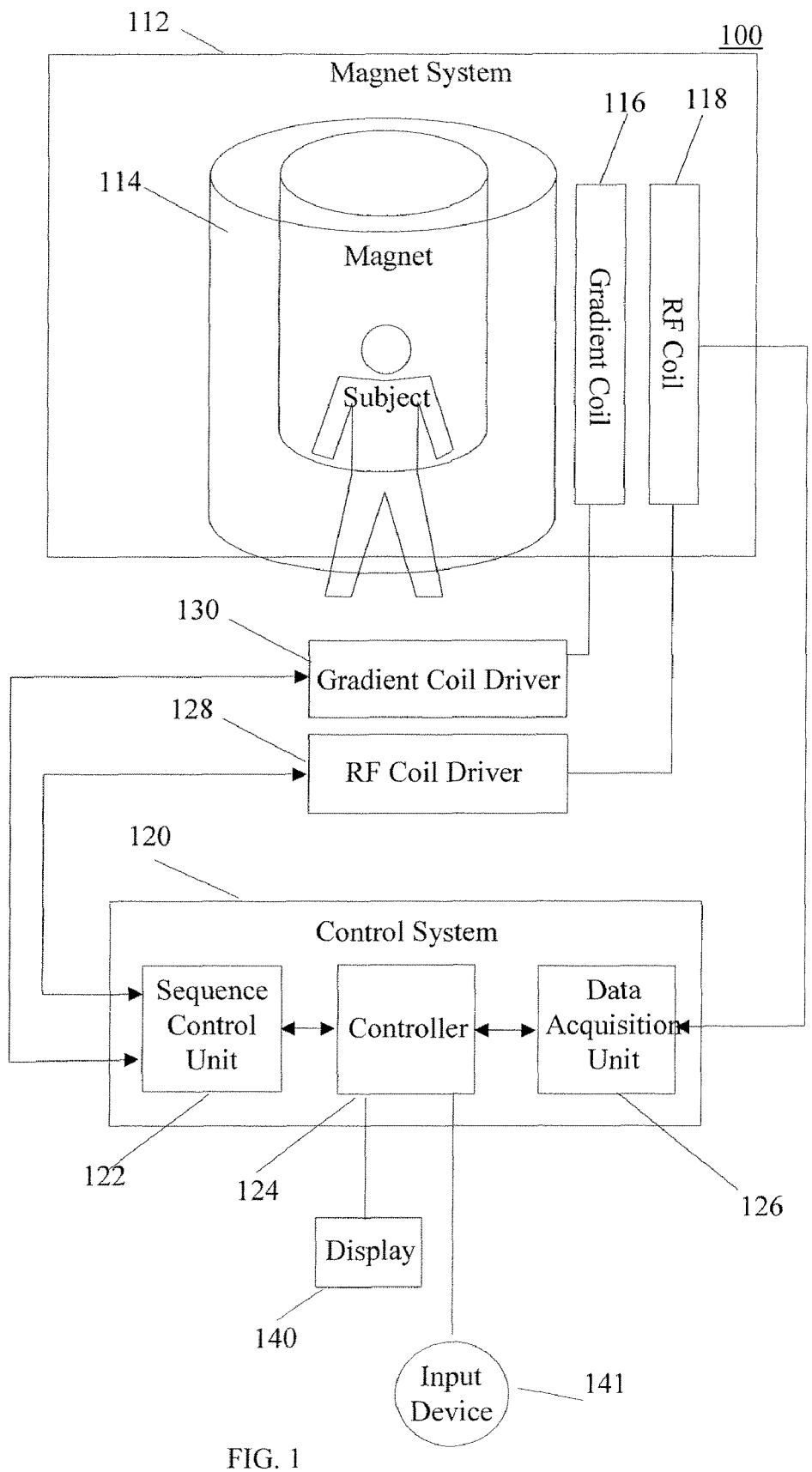
FIG. 1 is a diagram of an MRI system.

Novel methods and apparatus are provided herein for segmentation of MRI image data related to at least one component from MRI image data related to at least two components including the at least one component. For the purpose of the present disclosure an MRI image that is formed predominantly from fat protons is called a fat image. It may also be called a Dixon segmentation for a component such as fat. It may also be called a Dixon fat segmentation, if the component is fat. The same applies to water images. The Dixon methods, which may include one-point, two-point, three point and multi-point methods, for the purpose of the present disclosure are assumed to all generate at least a combined component image such as a combined fat and water image.

In the generic case, wherein protons of at least two components generate a combined image, it is assumed that a Dixon method will generate a combined image of the components that need to be separated into individual component Dixon segmentation images.

Pure fat and pure water images can be reconstructed from certain MR acquisitions based on the Dixon principle. These images are calculated by making use of the fact that protons bound in fat precess at different frequencies than protons bound in water. For defined echo times this leads to particular differences in phase which can be exploited by Dixon segmentation methods and algorithms to separate in image areas with predominantly fat or water content.

As was explained above, 2-point-Dixon segmentations compute the fractional signal contribution from fat and water for each voxel from dual echo scans with 0 degree and 180 degree differences between the fat and water signal. 1-point-Dixon segmentations compute voxels with mostly fat and voxels with mostly water content from scans with 180 degree phase difference. However, due to superimposed phase offsets given e.g. by the field inhomogeneity, the classification into which is the fat signal and which is the water signal can be difficult and often leads to misclassified images.

Dixon images are complementary sets of MRI image data, e.g. Dixon fat and Dixon water images, in the sense that in combination they show the content of the original MR images A T1-weighted image is an MRI image in which the image contrast is mainly determined by the longitudinal relaxation times, which is defined by the time that protons bound to specific molecules need to return from an excited to an equilibrium state. Aspects of T1 weighted MRI imaging are known in the art, and are for instance disclosed in U.S. Pat. No. 6,624,632 to Iriguchi et al. issued on Sep. 23, 2003 which is incorporated herein by reference in its entirety and in "Magnetic Resonance Imaging: Physical Principles and Sequence Design", E. Mark Haacke (Author), Robert W. Brown (Author), Michael R. Thompson (Author), Ramesh Venkatesan, Wiley-Liss, 1999", which is also incorporated herein by reference in its entirety. Fat is a substance that in general provides a higher signal and will appear bright on a T1 contrast MR image. Water nuclei have longer T1 times and thus in general provide a lower intensity signal in a T1 weighted MR image.

Figure 2:
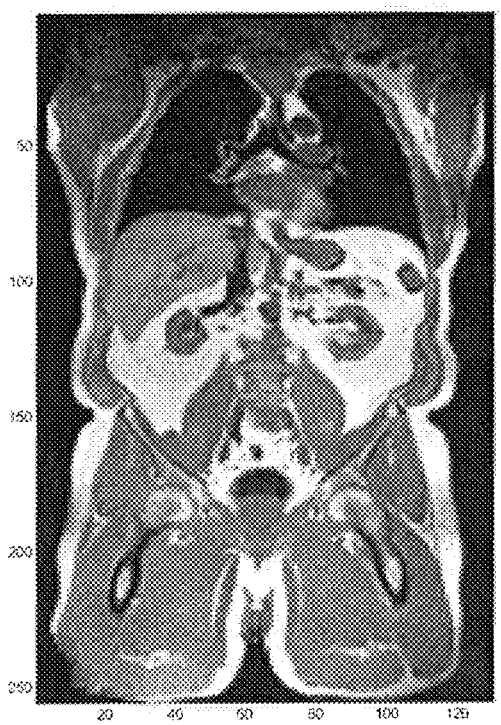
FIG. 2 is an MRI T1 weighted image.
Figure 3:
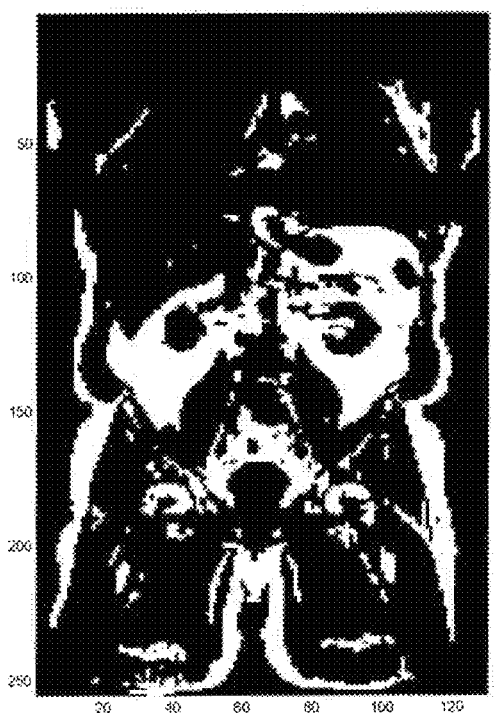
FIG. 3 is an MRI image generated in accordance with a Dixon method.
Figure 4:
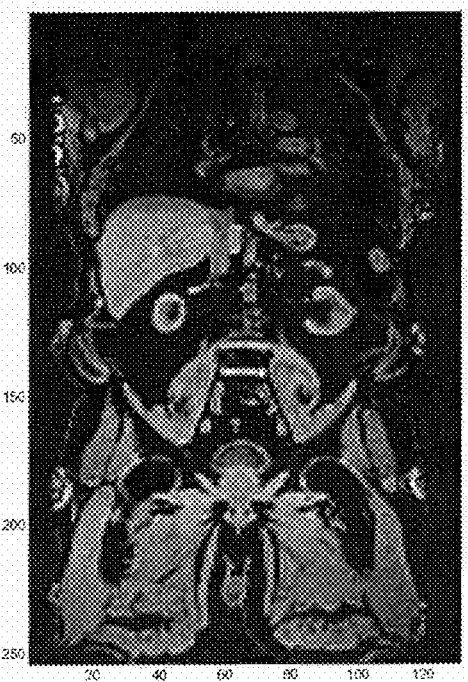
FIG. 4 is another MRI image generated in accordance with a Dixon method.

In accordance with an aspect of the present invention a combined water/fat image is generated from an object as is shown in FIG. 2. Then, in accordance with a further aspect of the present invention a 1-point Dixon image reconstruction produces 2 segmented images, with one of them being the fat and the other the water image. An example of a first-component image related to FIG. 2 is shown in FIG. 3; and an example of a second-component image related to FIG. 2 is shown in FIG. 4.

While it is known that the two components are water and fat, it may be unknown if the first component is water or fat, and if the second component is fat or water.

In accordance with an aspect of the present invention a basic fat segmentation is performed in the reconstructed magnitude image based on a simple gray value intensity based segmentation. This can for example be done from a T1 weighted scan, which might be scanned as an additional echo in a dual contrast scan, as shown in FIG. 2. In one embodiment the contrast with the strongest T1 weighting may be chosen. In a further embodiment other suitable contrasts than strongest T1 weighting may be used.

Figure 5:
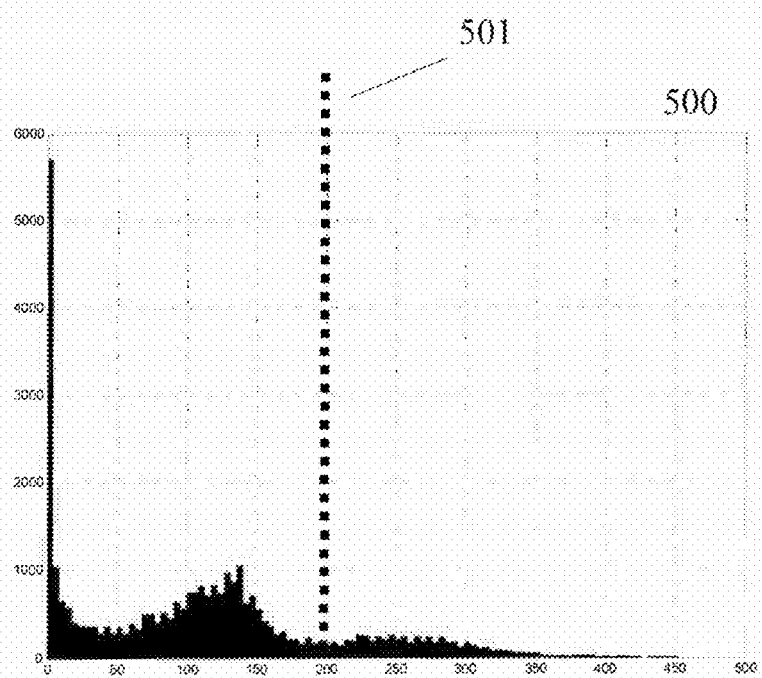
FIG. 5 is a grey intensity histogram of the image of FIG. 2.

A rough segmentation can for example be a threshold segmentation based on a (multi-class) Otsu threshold or on expectation maximization of Gaussian mixture models as shown in FIG. 5. FIG. 5 shows a histogram 500 of the T1 weighted image of FIG. 2. It is known that fat has a higher (brighter) intensity than water. One may select or calculate a threshold 501, above which all pixels may be assumed to be fat pixels. In one embodiment a user may select a threshold. In a further embodiment, such as the Otsu segmentation a threshold may be determined by the segmentation method. Other embodiments are also possible, for instance by determining a threshold based on a distribution of intensity levels.

Figure 6:
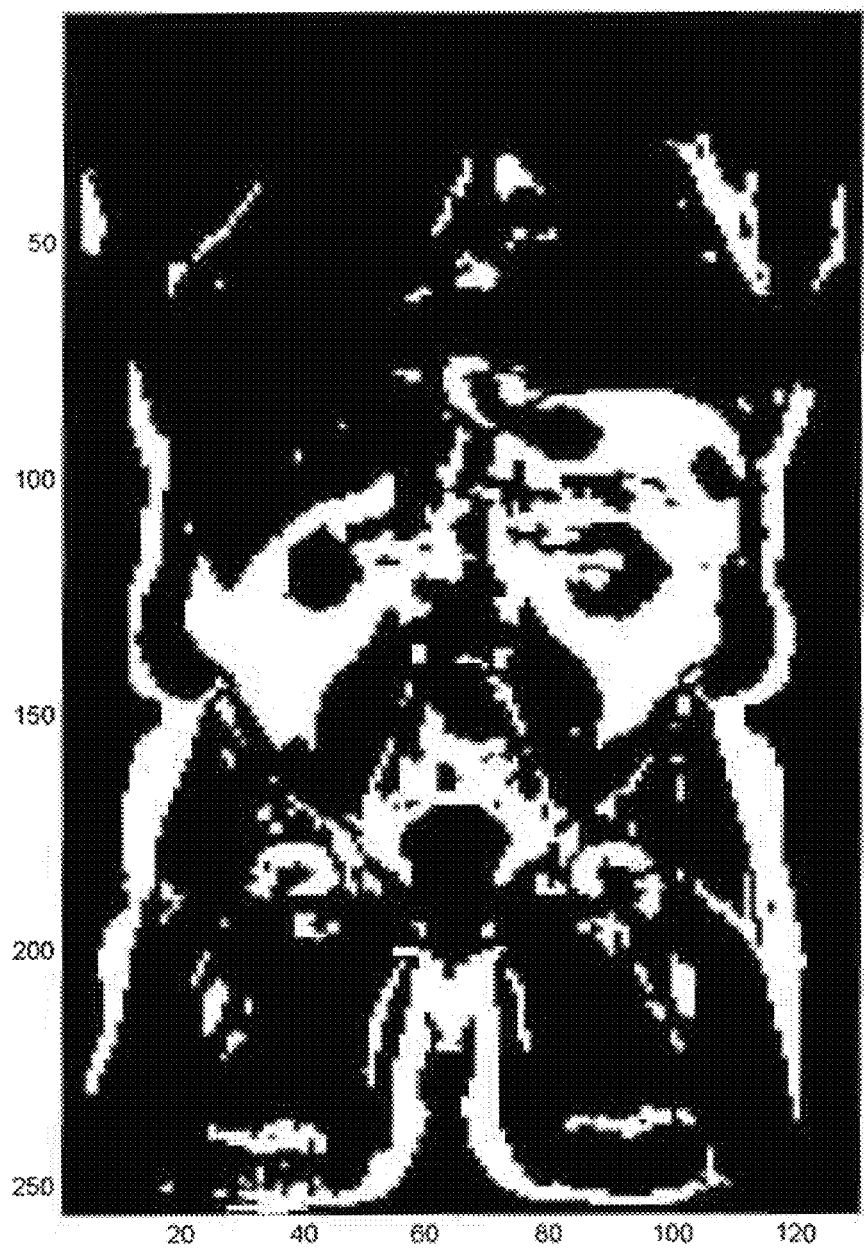
FIG. 6 is a segmentation of the image of FIG. 2 based on a grey intensity.

FIG. 6 shows the rough segmentation of FIG. 2 by only selecting the pixels on and/or above the threshold intensity.

Using only the rough segmentation may not be precise enough. Combining both methods yields a more robust fat segmentation of the T1 weighted image of FIG. 2.

In accordance with an aspect of the present invention, a basic fat segmentation is performed in the reconstructed magnitude image based on a simple gray value intensity based segmentation. This can for example be done from a T1 weighted scan, which might be scanned as an additional echo in a dual contrast scan, as shown in FIG. 2. In practice the contrast with the strongest T1 weighting may be chosen. In a further embodiment other suitable contrasts than strongest T1 weighting may be used.

A rough segmentation can for example be a threshold segmentation based on a multi-class Otsu threshold or on expectation maximization of Gaussian mixture models as shown in FIG. 5. These and other segmentation methods are known in the art and descriptions may be found in text books on image processing, such as Rafael C. Gonzalez, Richard E. Woods: *Digital Image Processing*. Addison-Wesley, Reading Mass 1992. ISBN 0-201-50803-6, which is incorporated herein by reference in its entirety.

FIG. 5 shows a histogram 500 of the T1 weighted image of FIG. 2. It is known that fat in general has a higher (brighter) intensity than water in T1 weighted MR images. One can select or calculate a threshold 501, above which all pixels may be assumed to be fat pixels. FIG. 6 shows the rough segmentation of FIG. 2 by only selecting the pixels on and/or above the threshold intensity. Using only the rough segmentation may not be precise enough. Combining both methods may yield a more robust fat segmentation of the T1 weighted image of FIG. 2. FIG. 6 is a rough segmentation of FIG. 2 using the threshold histogram of FIG. 5.

For classifying which of the images of FIG. 3 or FIG. 4 is the fat image in accordance with an aspect of the present invention, the similarity between either one of these images with the rough segmentation of FIG. 6 based on the histogram is examined. The image with the maximum similarity should be determined as the fat image.

Similarity may be defined in different ways. For example a cross-correlation between the images such as the image of FIG. 3 or FIG. 4 with the image of FIG. 6 may be used, expressed as:

$$S = \sum_{i \in \Omega} \frac{(x_i - \bar{x}) \cdot (y_i - \bar{y})}{\sqrt{(x_i - \bar{x})^2} \cdot \sqrt{(y_i - \bar{y})^2}}.$$

Herein, S is the correlation score and $x_i$ the image value at pixel i, with $\bar{x}$ being the mean value of the rough histogram based segmentation image and $y_i$ and $\bar{y}$ the ones from the potential Dixon fat image. This is summed over the entire image domain $\Omega$.

Another (and even simpler) possibility would be to use the segmentation from the binary mask and multiply it pixelwise with the normalized value of the corresponding pixel in the Dixon image.

$$S = \frac{1}{|\Omega|} \sum_{i \in \Omega} x_i \frac{y_i}{y_{max}}$$

For any of these measures the similarity for with the actual fat image is always significantly higher than for the water image.

A machine such as a computer can easily determine that the similarity or correlation of FIG. 6 is highest with the image of FIG. 3 and the lowest for the image of FIG. 4.

Figure 7:
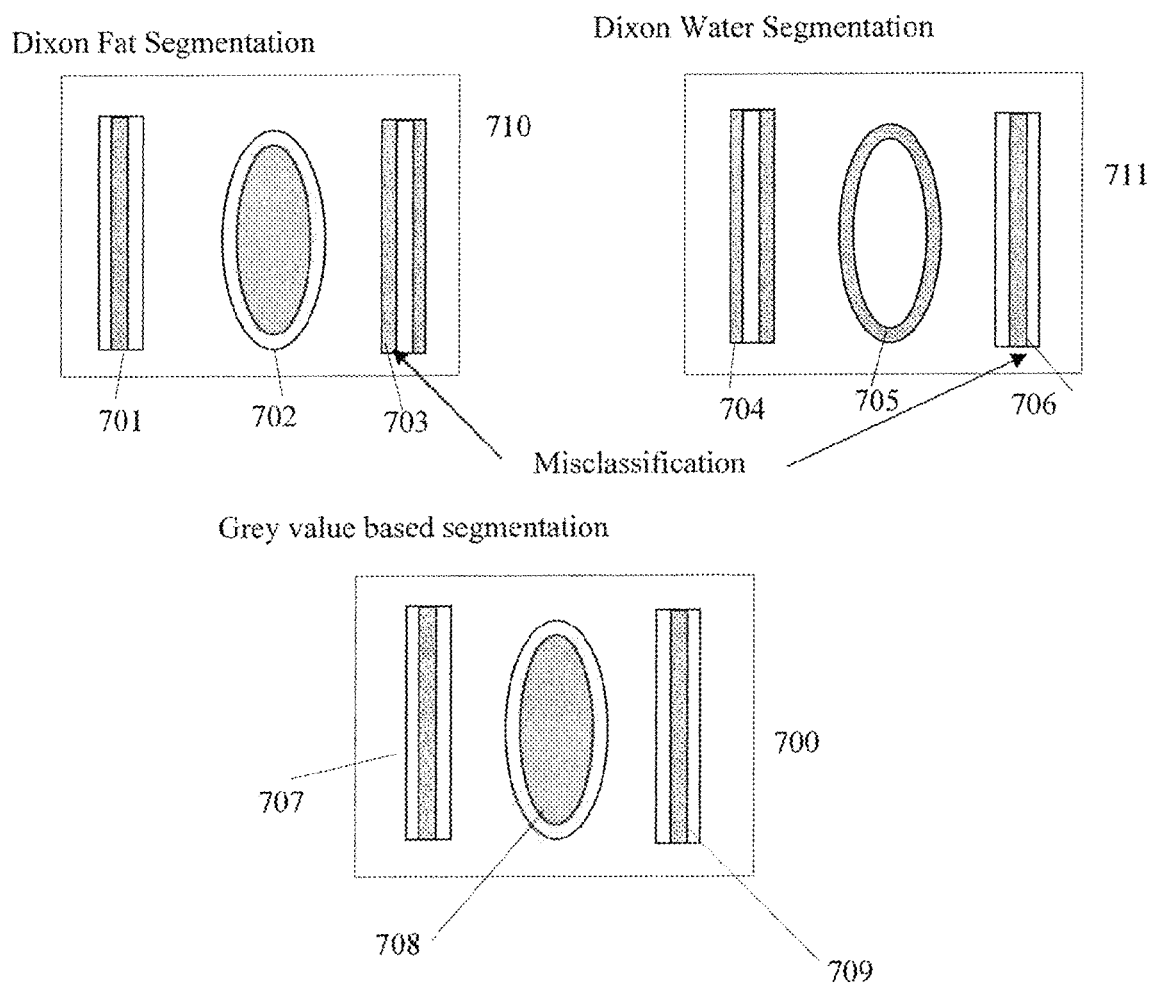
FIG. 7 is a diagram of a multi-component fat/water classification.

Dixon methods also tend to mix up connected components of different tissue types. One may apply a method for determining if a connected component is a fat component or a water component also to an image, wherein different parts of an object are acquired and processed by a Dixon method in an MRI image. For instance, one may acquire MRI images (combined and individual fat and water images) of connected components and classify these correctly. As an illustrative example one may acquire one or more MRI images of a person with arms stretched parallel to the head. This is illustrated in a diagram in FIG. 7. Image 700 is an intensity based segmentation of a T1 weighted image of a head 708 with right arm 707 and left arm 709, assuming the person's image is taken from a point of view above the person. Assume that one also generates individual fat and water images by using one of the Dixon methods: images 701 and 704 for the right arm, images 703 and 706 for the left arm and images 702 and 705 for the head. A combined Dixon fat segmentation 710 and a combined Dixon water segmentation 711 may be generated. However, images 703 and 706 have been misclassified.

In accordance with a further aspect, one may correctly classify individual connected components in an image by performing a correlation between each connected component of both the fat and water image with a grey-level segmentation of the complete image best suitable for a rough fat segmentation, e.g. the one with the strongest T1 weighting.

The individual components in water and fat segmentation will be correlated with a grey intensity level segmentation, which may be a rough segmentation. These are individual connected components of the same image. One may provide the part of a fat or water image that is outside the "matching area" with a value 0 or background, for instance the area with left arm and head may be considered 0 when one is trying to find the classification of the right arm. One may also limit correlation to areas of interest.

Figure 8:
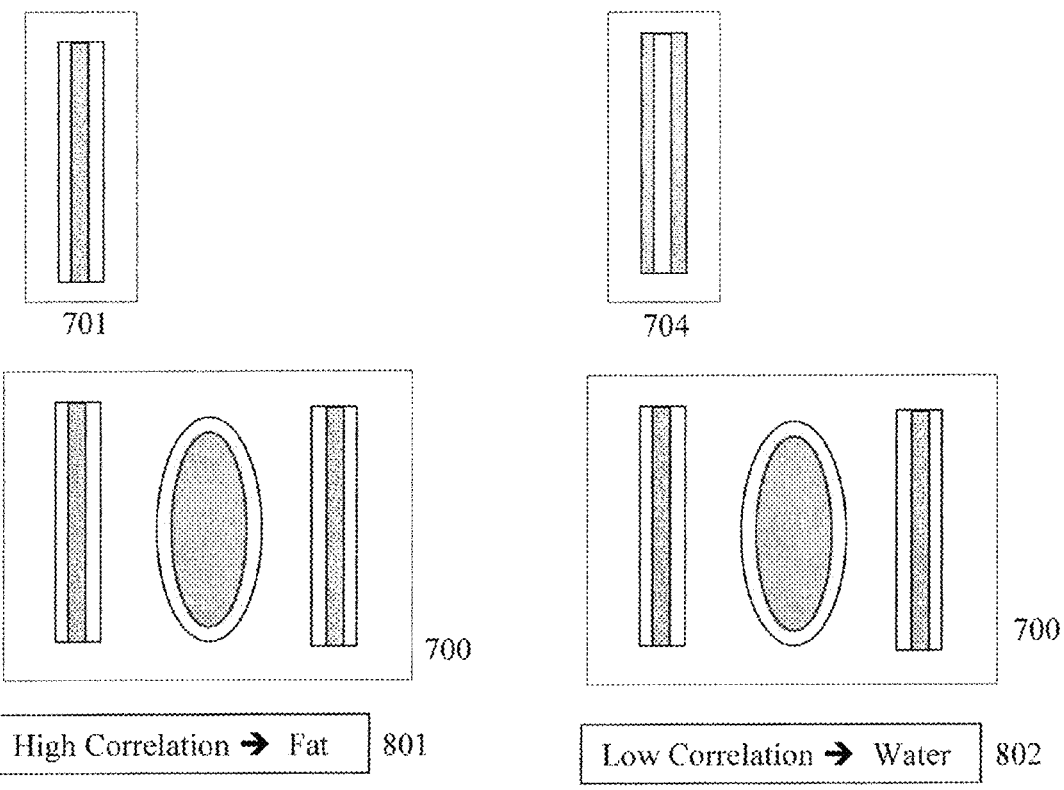
FIG. 8 is a diagram of a classification step in accordance with an aspect of the present invention.
Figure 9:
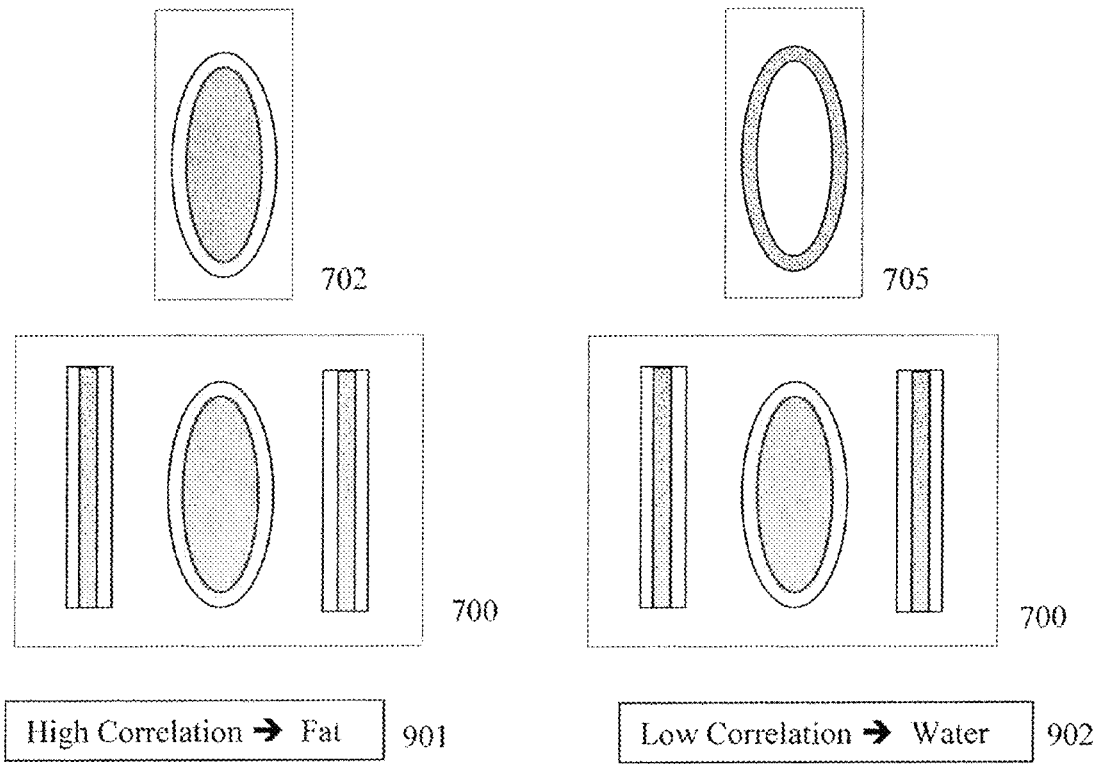
FIG. 9 is a diagram of a further classification step in accordance with an aspect of the present invention.

FIG. 8 shows correlation of the right arm Dixon images 701 and 704 with segmentation image 700. Step 801 shows a high correlation between 701 and 700 which indicates a fat image 701. Step 802 shows a low correlation between 704 and 700 which indicates a water image. FIG. 9 shows a similar process of the fat and water image of the head 702 and 705. Step 901 shows a high correlation and step 902 shows a low correlation, indicating that 702 is a fat image of the head and 705 is a water image.

It is pointed out that the terms high correlation and low correlation are used. One may, based on experience, set a threshold value for what would be considered a high correlation value and what a low correlation value. With such a threshold one may determine immediately the outcome of a classification on a single correlation. If a correlation of an image generates a high correlation value the image is a fat image and its counterpart is necessarily a water image. For instance, one may derive a threshold value of a segmentation by determining an auto-correlation value of the segmentation. One may also create a modified auto-correlation value, by for instance imposing a value on a pixel that that is above a threshold in the segmentation. One may then use the auto-correlation or a modified auto-correlation as a threshold for determining if a cross-correlation is "high" or "low".

In a further embodiment one may not have a clear threshold. In that case one has to determine a correlation value for both the fat image and the water image, though it is not known a priori by a machine what the actual classification is. A first correlation may generate a correlation value that is higher than the correlation value of a second correlation. In that case the image with the higher correlation value is the fat image and the image with the lower correlation value is a water image. In that case one should interpret a "high correlation" to mean "a higher correlation value of at least two correlation values" and a "low correlation" to mean "a lower correlation value of at least two correlation values".

Figure 10:
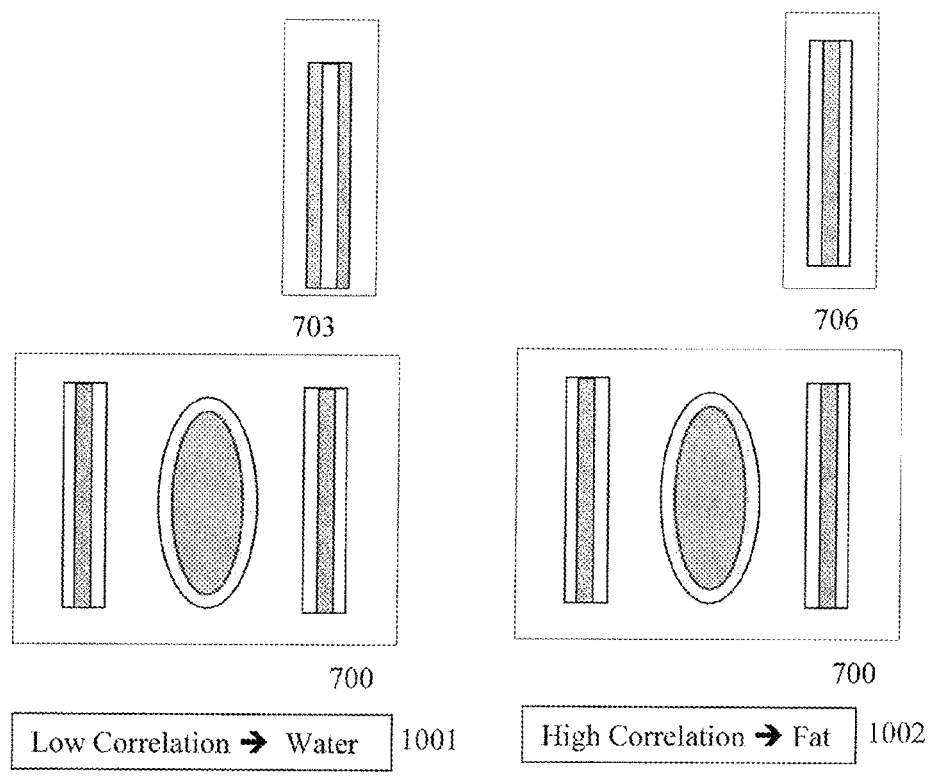
FIG. 10 is a diagram of a further classification step in accordance with an aspect of the present invention.
Figure 11:
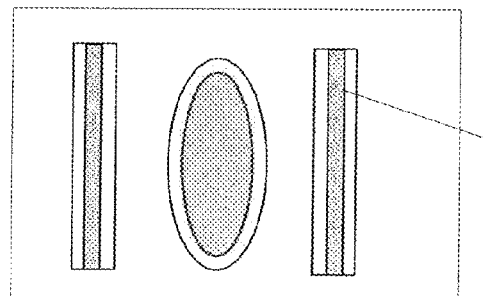
FIG. 11 is a diagram of a multi-component classification step in accordance with an aspect of the present invention.
Figure 11:
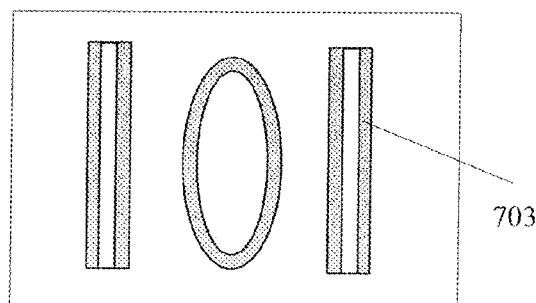

One may perform a correlation as is illustrated in FIG. 10 for the left arm images 703 and 706. The image 703 has a low correlation with 700 and thus is a water image and image 706 has a high correlation value and thus is a fat image.

The fat and water images 701, 702, 703, 704, 705, and 706 can be correctly arranged in fat image 1101 and water image 1102. It is shown that image 706 which was first misclassified as a water image is now correctly displayed as a fat image and 703 is part of the water image.

Accordingly, a method is provided to determine to which component an individually generated MRI image should be assigned related to a multi-component MRI scan.

The illustrative examples provided herein apply to segmentation of water and fat images. One may also apply Dixon methods to segment other tissue types with different precession frequencies, although fat and water may be most abundant and common. Accordingly, aspects of the present invention are not limited to only the segmentation and classification of images with fat tissue from images with what generally may be called water images. Segmentation and/or classification of images with other tissue types by using aspects of the present invention are specifically contemplated.

A Segmentation and and/or Classifying System

Figure 12:
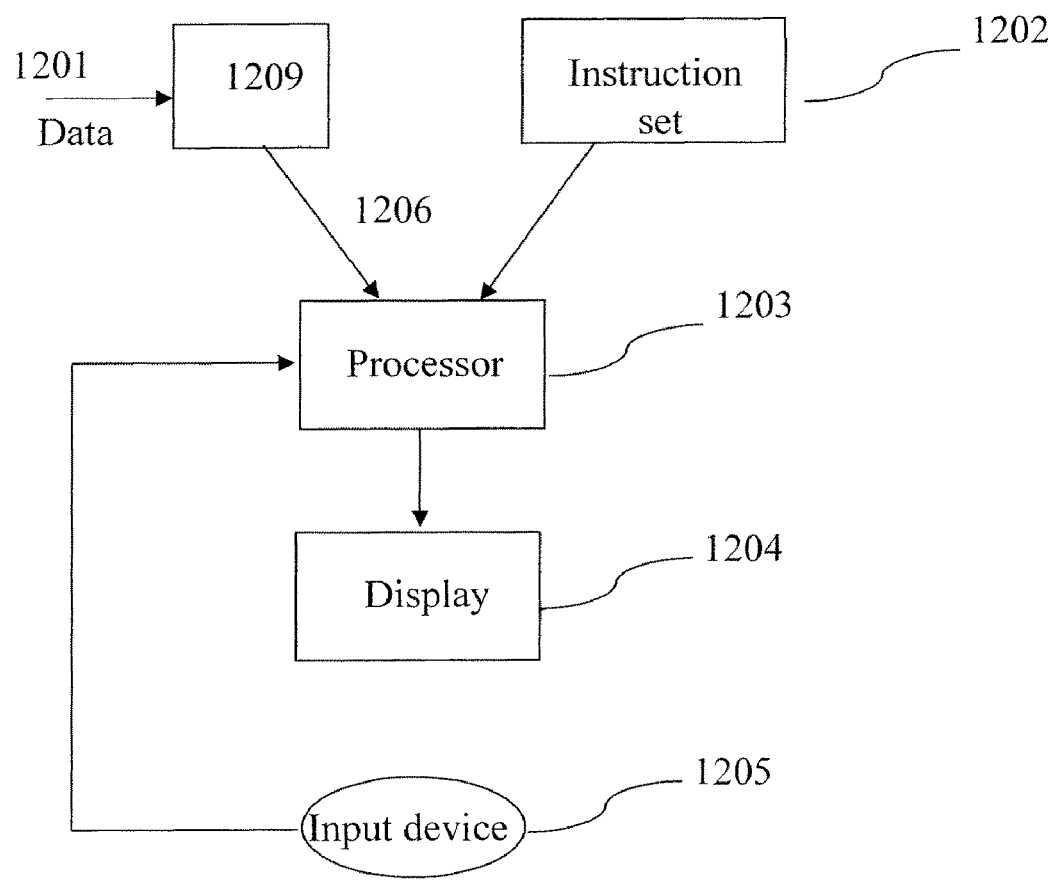
FIG. 12 illustrates a computer system for performing the steps described herein in accordance with one or more aspects of the present invention.

The image classifying methods that are provided as an aspect of the present invention can be executed by a system as shown in FIG. 12. The system is provided with data 1201 representing image data. Such image data may be MRI data, which is provided by an MRI machine as shown in for instance FIG. 1. The MRI data may be stored in a memory 1209. Image data may be provided by the memory 1209 on an input 1206 to a processor 1203. An instruction set or program executing the methods of the present invention may be stored in an instruction memory 1202, where it is available for retrieval by the processor 1203 to be loaded for execution. The instruction set retrieved from 1202 and loaded for execution on processor 1203 may be applied to image data made available for processing by processor 1203 from the memory 1209. An image, such as a segmented and/or a registered image may be output to a device 1204. Such a device for instance can be a display such as a computer screen. The processor can be dedicated hardware. However, the processor can also be a CPU, or a GPU or any other computing device that can execute the instructions of 1202. An input device 1205 like a mouse, or track-ball or other input devices may be present to allow a user to for instance place foreground and/or background seeds in an image provided for instance on the display 1204 for processing by the processor. The input device may also be used to start or stop instructions on the processor. Accordingly, the system as shown in FIG. 12 provides an apparatus or a system for MRI image classification by implementing and using methods disclosed herein as instructions that can be executed by the processor.

The term pixel herein also intends to cover the term voxel. Apparatus and methods provided herein apply to the segmentation, registration and processing of 2D and 3D image data. A pixel is a picture element that can be displayed in an image. A pixel is also a data element, representing an intensity, grey level or color value in an image. Pixels may be arranged as data elements in a 2D or 3D matrix. A pixel or its data may be processed by a processor.

A fat image herein is intended to mean an image from magnetic resonance data, that represents tissue that substantially consists of fat, for instance about 50% or more in a first embodiment that is for single point Dixon segmentations. In a further embodiment a fat image is an image wherein pixels represent for 70% or more fat tissue. In a further embodiment, for multi-point Dixon methods, a fat image herein is intended to mean an image from magnetic resonance data, in which the voxel values represent the fraction of signal in the MR image which stems from protons bound to fat.

The following references are generally descriptive of the background of the present invention and are hereby incorporated herein by reference:

[1] Dixon W. T. Simple proton spectroscopic imaging. Radiology 1984; 153:189-194;

[2] Glover G H, Schneider E. Three-point Dixon technique for true water/fat decomposition with B0 inhomogeneity correction. Magn Reson Med 1991; 18:371-383;

[3] Ma J. Breath-hold water and fat imaging using a dual-echo two-point Dixon technique with an efficient and robust phase-correction algorithm. Magn Reson Med 2004; 52:415-419;

[4] Coombs B D, Szumowiski J, Coshow W. Two-point Dixon technique for water-fat signal decomposition with B0 inhomogeneity correction. Magn Reson Med 1997; 38:884-889;

[5] Jong Bum Son et al, Concepts in Magnetic Resonance Part B: Magnetic Resonance Engineering, Volume 33B Issue 3, Pages 152-162 Published Online: 10 Jul. 2008, Wiley Publications, Single-point Dixon water-fat imaging using 64-channel single-echo acquisition MRI;

[6] Jingfei Ma. A single-point Dixon technique for fat-suppressed fast 3D gradient-echo imaging with a flexible echo time, Journal of Magnetic Resonance Imaging February 2008;

[7] Rafael C. Gonzalez, Richard E. Woods: *Digital Image Processing*. Addison-Wesley, Reading Mass 1992; and

[8] E. Mark Haacke (Author), Robert W. Brown (Author), Michael R. Thompson (Author), Ramesh Venkatesan, Magnetic Resonance Imaging: Physical Principles and Sequence Design", Wiley-Liss, 1999.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method for classifying tissue type from MRI image data of an object including at least a first type and a second type of tissue, by processing a first set of MRI image data representing substantially the first type of tissue, and a combined set of MRI image data representing at least the first and the second type of tissue, comprising using a processor to:
   create a segmentation from the combined set of MRI image data; and
   determine a first correlation value between the segmentation and the first set of MRI image data.

2. The method as claimed in claim 1, wherein a pixel in the segmentation has an intensity value above a threshold.

3. The method as claimed in claim 1, further comprising:
   determining a threshold correlation value;
   comparing the first correlation value with the threshold correlation value; and assigning a tissue type to the first set of MRI image data based on the comparison of the previous step.

4. The method as claimed in claim 1, further comprising: determining a second correlation value between the segmentation and a second set of MRI image data of the object representing substantially the second tissue.

5. The method as claimed in claim 4, further comprising: classifying the tissue type of the first set of MRI image data based on a relative value of the first correlation value compared to the second correlation value.

6. The method as claimed in claim 1, wherein the first set of MRI image data is generated by applying a Dixon method.

7. The method as claimed in claim 1, wherein the first type of tissue is a fat tissue.

8. The method as claimed in claim 1, wherein the segmentation is a grey value based segmentation.

9. The method as claimed in claim 1, wherein the segmentation is performed by using a method selected from the group consisting of an expectation maximization segmentation method and an Otsu threshold segmentation method.

10. The method as claimed in claim 1, wherein a classification is applied to one or more additional objects related to the object.

11. A system for classifying tissue type from MRI image data of an object including at least a first type and a second type of tissue, by processing a first set of MRI image data representing substantially the first type of tissue, and a combined set of MRI image data representing at least the first and the second type of tissue, comprising:
   a Magnetic Resonance Imaging machine that generates magnetic resonance image data;
   a processor for processing the magnetic resonance data in accordance with instructions for performing the steps of:
      creating a segmentation from the combined set of MRI image data; and
      determining a first correlation value between the segmentation and the first set of MRI image data.

12. The system as claimed in claim 11, wherein a pixel in the segmentation has an intensity value above a threshold.

13. The system as claimed in claim 11, further comprising instructions to perform:
   determining a threshold correlation value;
   comparing the first correlation value with the threshold correlation value; and
   assigning a tissue type to the first set of MRI image data based on the comparison of the previous step.

14. The system as claimed in claim 11, further comprising instructions to perform:
   determining a second correlation value between the segmentation and a second set of MRI image data of the object representing substantially the second tissue.

15. The system as claimed in claim 14, further comprising instructions to perform:
   classifying the tissue type of the first set of MRI image data based on a relative value of the first correlation value compared to the second correlation value.

16. The system as claimed in claim 11, wherein the first set of MRI image data is generated by applying a Dixon method.

17. The system as claimed in claim 11, wherein the first type of tissue is a fat tissue.

18. The system as claimed in claim 11, wherein the segmentation is a grey value based segmentation.

19. The system as claimed in claim 11, wherein the segmentation is performed by using a method selected from the group consisting of an expectation maximization segmentation method and an Otsu threshold segmentation method.

20. The system as claimed in claim 11, wherein a classification is applied to one or more additional objects related to the object.

* * * * *